United States Patent
Dong et al.

(10) Patent No.: US 7,343,993 B2
(45) Date of Patent: Mar. 18, 2008

(54) POWER SYSTEM FOR DUAL-MOTOR HYBRID VEHICLE

(75) Inventors: Chunbo Dong, Changehun (CN); Zhiqiang Tang, Changehun (CN); Jun Li, Changehun (CN)

(73) Assignee: China First Automobile Group Corporation, Changehun (CN)

( * ) Notice: Subject to any disclaimer, the term of this patent is extended or adjusted under 35 U.S.C. 154(b) by 41 days.

(21) Appl. No.: 10/537,794

(22) PCT Filed: Dec. 8, 2003

(86) PCT No.: PCT/CN03/01049

§ 371 (c)(1), (2), (4) Date: Jun. 6, 2005

(87) PCT Pub. No.: WO2004/052672

PCT Pub. Date: Jun. 24, 2004

(65) Prior Publication Data

US 2006/0113127 A1    Jun. 1, 2006

(30) Foreign Application Priority Data

Dec. 8, 2002    (CN) ............... 02 1 44747

(51) Int. Cl.
*B60K 1/00*    (2006.01)
(52) U.S. Cl. .......... 180/65.2; 180/65.4; 903/914; 701/22
(58) Field of Classification Search ......... 180/65.4, 180/65.6, 65.2, 65.3, 65.5; 903/914, 922, 903/923; 701/22, 62
See application file for complete search history.

(56) References Cited

U.S. PATENT DOCUMENTS 5,259,260 A * 11/1993 Schneider ............... 74/331

(Continued)

FOREIGN PATENT DOCUMENTS

CN        1225317 A    8/1999

(Continued)

OTHER PUBLICATIONS

PCT Search Report for PCT/CN03/001049 dated Mar. 15, 2004.

*Primary Examiner*—Hau Phan
(74) *Attorney, Agent, or Firm*—Kalow & Springut LLP

(57) ABSTRACT

A power system for dual-motor hybrid vehicle is a combined driving unit fed with fuel and electric power, comprising: an internal combustion engine, a motor, a clutch, a transmission, a power battery, a braking system and an entire vehicle controller, wherein the system further comprises: a main motor, an auxiliary motor, and a mechanical stepped transmission, a rotor shaft of the main motor being connected with the output shaft of the transmission, a rotor shaft of the auxiliary motor being connected with the crankshaft of the internal combustion engine; the main motor and the auxiliary motor being electrically connected with the power battery. With the control of the entire vehicle controller, the vehicle can be driven automatically by the hybrid power system in the follow modes: pure motor driving mode, series driving mode, parallel driving mode, hybrid driving mode, idling stop mode of the internal combustion engine, braking energy recovery mode, independently driving mode of the internal combustion engine, and motor auxiliarily driving mode during shifting. The present invention provides a new power system for hybrid vehicle, with simple structure, lower cost, less energy consumption and less exhaust gas emissions.

7 Claims, 2 Drawing Sheets

U.S. PATENT DOCUMENTS

| | | | | |
|---|---|---|---|---|
| 5,495,906 A | * | 3/1996 | Furutani | 180/65.2 |
| 5,722,502 A | * | 3/1998 | Kubo | 180/65.4 |
| 5,910,722 A | | 6/1999 | Lyons et al. | |
| 5,927,417 A | * | 7/1999 | Brunner et al. | 180/65.6 |
| 6,048,289 A | * | 4/2000 | Hattori et al. | 180/65.2 |
| 6,142,907 A | * | 11/2000 | Minowa et al. | 180/65.2 |
| 6,258,006 B1 | * | 7/2001 | Hanyu et al. | 903/923 |
| 6,276,472 B1 | * | 8/2001 | Takashima et al. | 180/65.2 |
| 6,338,391 B1 | * | 1/2002 | Severinsky et al. | 180/65.2 |
| 6,416,437 B2 | | 7/2002 | Jung | |
| 6,481,516 B1 | | 11/2002 | Field et al. | |
| 6,517,464 B2 | * | 2/2003 | Yamazaki et al. | 180/65.2 |
| 6,625,534 B2 | * | 9/2003 | Suzuki et al. | 180/65.1 |
| 6,645,106 B2 | * | 11/2003 | Goo | 475/72 |
| 6,668,953 B1 | * | 12/2003 | Reik et al. | 180/53.8 |
| 6,845,305 B1 | * | 1/2005 | Raftari et al. | 701/22 |
| 2002/0179351 A1 | | 12/2002 | Shimabukuro et al. | |

FOREIGN PATENT DOCUMENTS

CN        2501716 Y        7/2002

* cited by examiner

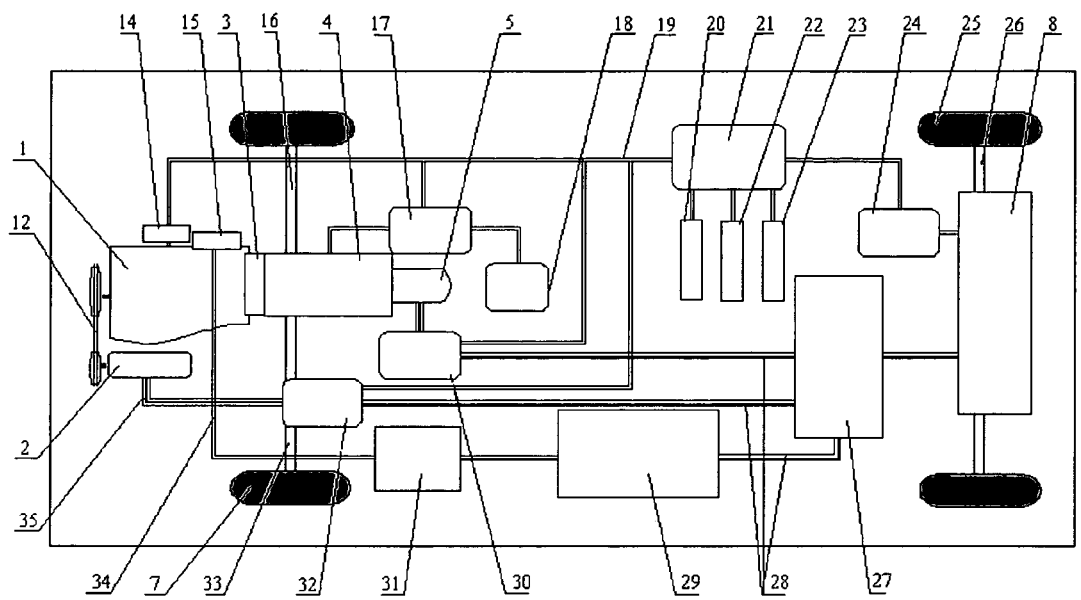
Fig. 3
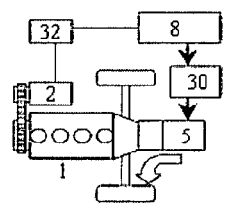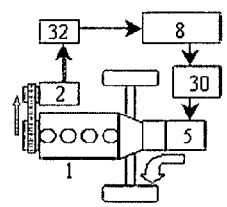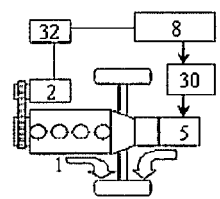
Fig. 4a　　Fig. 4b　　Fig. 4c　　Fig. 4d
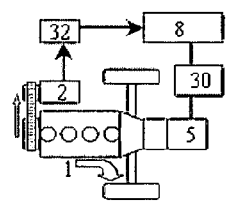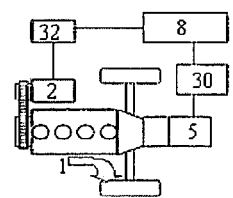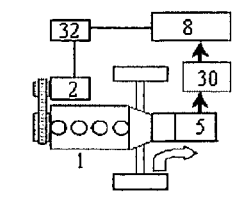
Fig. 4e　　Fig. 4f　　Fig. 4g　　Fig. 4h

POWER SYSTEM FOR DUAL-MOTOR HYBRID VEHICLE

FIELD OF THE INVENTION

The present invention relates to a hybrid power system of a vehicle fed with fuel and electric power.

BACKGROUND OF THE INVENTION

It is more and more important to consume energy efficiently and protect the environment. Accordingly, hybrid vehicles are becoming main stream trends, which are efficient, energy-saving and environment protecting. Hybrid vehicles relate to techniques on vehicles, power sources, electronics, computers and controls, which have been researched and developed for more than 10 years in the world. Industrialization of the hybrid vehicles has been achieved by Toyota Corp. and Honda Corp., Japan. Hybrid vehicles have also been researched and developed widely in China.

Power systems for hybrid vehicles can be divided into three basic types, i.e. series arrangement, parallel arrangement, and the hybrid arrangement, as well as various variants, each having its own advantages and disadvantages. Typical examples are the THS hybrid system of the Prius Hybrid car of Toyota Corp., and the IMA parallel system of the Insight Hybrid car of Honda Corp. The THS system is a hybrid arrangement type, which connects an internal combustion engine with a generator and a motor via planetary gears. A part of the power source from the internal combustion engine is transmitted to a final drive via a planetary carrier and a ring gear of planetary gears, while another part drives the generator via the planetary carrier and a sun gear of the planetary gears, and then the electric power generated from the generator drives the motor. The two parts of the powers are transmitted to the driving wheels to drive the vehicle via the final drive and the drive shaft. The rest of the power from the internal combustion engine is used to charge the power battery via the generator. An electric motor can drive the vehicle independently in a pure electric-driving mode, which can recover most of the braking energy. The IMA system is a parallel arrangement type, in which a motor (motor and generator combined together) is arranged between an internal combustion engine and a clutch. The motor can start the internal combustion engine and also supply supplementary power. Since it is connected with the internal combustion engine directly, the motor can't drive the vehicle independently, accordingly no pure motor driving mode exists, and much less of the braking energy can be recovered.

The Prius THS system of Toyota Corp has multiple driven modes, strong hybrid propulsion but with complicated structure, great power of motor, and high manufacturing cost. Since a part of the power from the internal combustion engine is transformed twice from mechanical power to electric power and then electric power to mechanical power again, the transmitting efficiency of the entire system is low. The IMA system of the Insight Hybrid car of Honda Corp. has simpler structure, lower manufacturing cost, however it has less driving modes, weaker hybrid propulsion, more energy-consumption and more exhaust gas emission than those in the Prius THS system of Toyota Corp.

SUMMARY OF THE INVENTION

The power systems for hybrid vehicles in the art either have high energy efficiency but with complicated structure and high manufacture cost, or have simpler structure and low cost but with low energy efficiency. An object of present invention is to provide a new type of power system for dual-motor hybrid vehicles with a simple structure, low cost, less energy consumption and less exhaust gas emissions, and which is capable of switching driving modes in accordance with the driving conditions.

To achieve the above object, the present invention provides a power system for a dual-motor hybrid vehicle, comprising: an internal combustion engine, a clutch, a stepped transmission, a drive shaft, a brake system and driving wheels, wherein the power system further comprises: a main motor, a rotor shaft of the main motor connected to a output shaft of the stepped transmission; an auxiliary motor, a rotor shaft of the auxiliary motor connected to a crankshaft of the internal combustion engine via a drive mechanism; the main motor and the auxiliary motor are electrically connected with a power battery, and an entire vehicle controller, which can make the power system work in the following operation modes automatically: 1) when the vehicle is in low-speed running operation condition, the system works in a pure electrical driving mode in which the internal combustion engine does not work, and only the main motor drives the drive shaft, or the system works in a series driving mode in which the internal combustion engine only drives the auxiliary motor that generates electric power, and the generated electric power is transmitted to the main motor via the power battery to drive the drive shaft; 2) when the vehicle is in full-accelerating operation condition, the system works in a parallel driving mode in which both the internal combustion engine and the main motor drive the vehicle simultaneously; 3) when the vehicle is in braking and decelerating operation condition, the system works in an energy recovery mode in which the main motor is controlled to brake and generate electric power, and the power battery is recharged; 4) when the vehicle is during transmission shifting, the system works in auxiliary-driving mode in which the main motor drives the vehicle auxiliary during shifting; 5) when the vehicle is in idling stop operation condition, the system works in an idling stop mode in which the internal combustion engine stops working, and 6) when the vehicle is in normal driving operation condition, the system works in normal running mode in which the internal combustion engine drives the vehicle independently.

Accordingly, the present invention provides advantages by using a dual-motor system, and the vehicle can be drive in several modes. With a stepped transmission (manual transmission MT or automatic transmission AMT), a simple and compact structure is achieved as well as having light weight and low cost, which is suitable for conventional power systems for vehicles. The main motor drives the driving wheels in a changeless speed ratio, and the main motor drives the vehicle auxiliarily during shifting when the clutch is released, thus power driving will never cease during shifting, and the vehicle is made more comfortable to ride. Also, the distance of the driving line between the motor and the wheels is short, which ensures the high efficiency in the motor driving mode and braking energy recovery mode.

BRIEF DESCRIPTION OF THE DRAWINGS

FIG. 3 is a schematic view showing the principle of the power system of the invention; and FIG. 4a-4h are schematic views showing the applicable driving modes and the energy-transmitting directions of the invention, in which FIG. 4a illustrates the idling stop mode, FIG. 4b illustrates the electrical driving mode, FIG. 4c illustrates the serial driving mode, FIG. 4d illustrates the parallel driving mode, FIG. 4e illustrates the hybrid driving mode, FIG. 4f illustrates the engine driving and generating electric power mode, FIG. 4g illustrates the engine driving mode, and FIG. 4h illustrates the brake energy recovery mode.

DESCRIPTION OF THE PREFERRED EMBODIMENTS

The configuration of the present invention will be apparent from the following description of embodiments with reference to the accompanying drawings.

Figure 1:
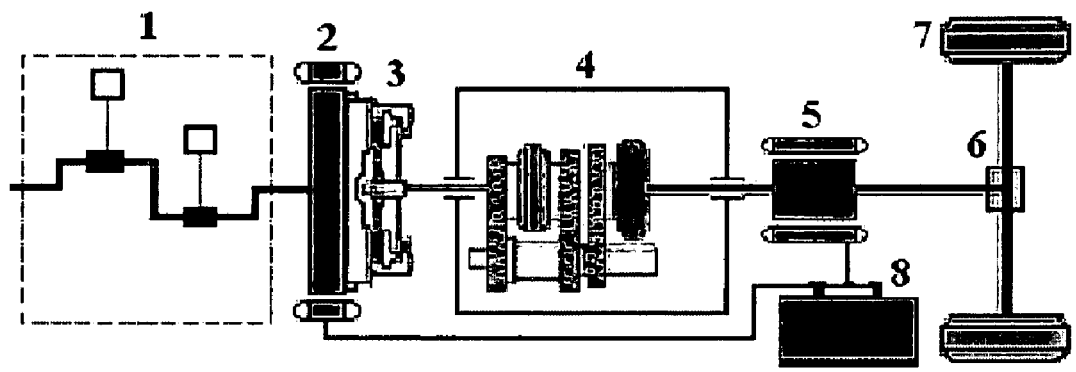
FIG. 1 is a schematic view showing a basic arrangement of the invention.

As shown in FIG. 1, the power system of the present invention includes an internal combustion engine 1, an auxiliary motor 2, a clutch 3, a transmission 4, a main motor 5, a final drive and differential 6 and a driving wheel 7, which are connected in series, and the auxiliary motor 2, the main motor 5 are electrically connected with a power battery 8, respectively. The main motor 5 is arranged adjacent to the transmission 4, the rotor shaft of the main motor 5 being connected directly with the output shaft of the transmission 4, the auxiliary motor 2 is arranged between the internal combustion engine 1 and the clutch 3, the rotor shaft of the auxiliary motor 2 being connected with the crankshaft of the internal combustion engine.

Figure 2:
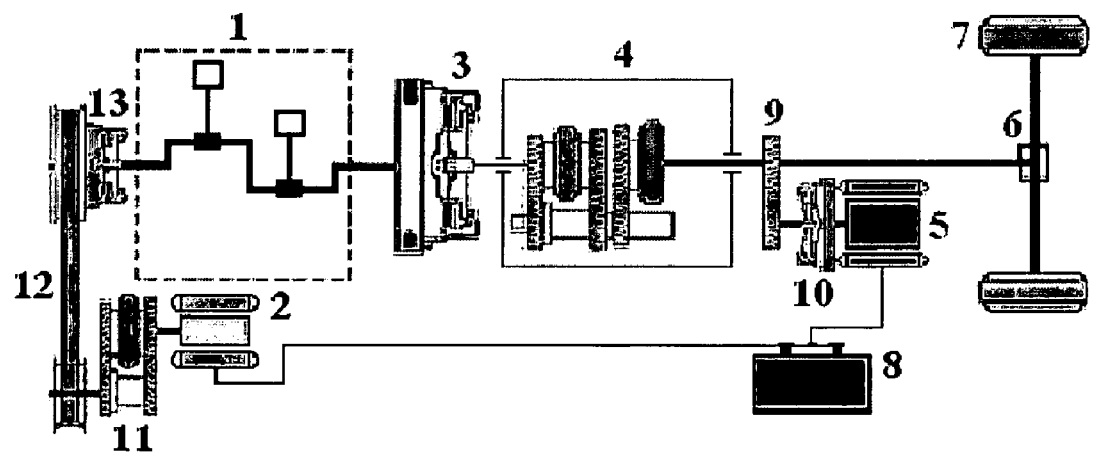
FIG. 2 is a schematic view showing a variant arrangement derived from the arrangement of FIG. 1.

As shown in FIG. 2, in the arrangement shown in the FIG. 1, the main motor 5 may also be connected with the output shaft of the transmission 4 via a drive mechanism 9, the auxiliary motor 2 may also be connected with the crankshaft of the internal combustion engine 1 via a drive mechanism 12. A clutch 10 and a clutch 13 may also be arranged between the main motor 5 and the transmission 4, and between the auxiliary motor 2 and the internal combustion engine 1, respectively, so that the main motor 5 and the auxiliary motor 2, when not running, can be disconnected from the transmission 4 and the internal combustion engine 1, respectively, thus less energy will be consumed. The auxiliary motor 2 may also be connected with the drive mechanism 12 via a transmission 11. The drive mechanism 9 of the main motor and the drive mechanism 12 of the auxiliary motor can be driven by belts, chains, or gears. The main motor and the auxiliary motor are connected independently and separately from each other, both of which can vary in multiple variants.

The working principles for the basic arrangement of the power system of the present invention are mainly the same as those for derived variants. One example of a derived variant will be described below for illustration of the working principles of the power system.

As shown in FIG. 3, 1 denotes an internal combustion engine, 2 denotes an auxiliary motor, 3 denotes a clutch, 4 denotes a transmission, 5 denotes a main motor, 7 denotes a front (driving) wheel, 8 denotes a power battery, 12 denotes a drive mechanism, 14 denotes an internal combustion engine control unit, 15 denotes a spare starter, 16 denotes a right drive shaft, 17 denotes a transmission controller, 18 denotes a transmission switch, 19 denotes a signal circuit, 20 denotes a ignition switch, 21 denotes an entire vehicle controller, 22 denotes a brake pedal, 23 denotes an accelerator pedal, 24 denotes a battery control unit, 25 denotes a rear wheel, 26 denotes a rear axle, 27 denotes a distribution box, 28 denotes a high voltage DC circuit, 29 denotes a DC/DC converter, 30 denotes a main motor controller, 31 denotes a regular low voltage battery, 32 denotes an auxiliary motor controller, 33 denotes a left drive shaft, 34 denotes a low voltage circuit, 35 denotes a high voltage AC circuit, respectively.

In the arrangement, the main motor 5 is arranged in the rear end of the transmission 4 (the transmission being in the form of AMT and integrated with a final drive and differential), the rotor shaft of the motor being connected with the output shaft of the transmission directly. The auxiliary motor 2 is arranged on one side of the internal combustion engine, and is connected with the front end of the crankshaft of the internal combustion engine via belts. In the arrangement, the main/auxiliary motor controller 30/32, the controller 17 of the automatic mechanical transmission (AMT), the entire vehicle controller 21 and the battery control unit 24 are electronic devices of the hybrid power system required for energy-management and automatic control. The transmission switch 18, the ignition switch 20, the brake pedal 22 and the accelerator pedal 23 are devices for transferring instructions from the drivers.

The entire vehicle controller 21 of the present invention can control the power system of the dual-motor hybrid vehicle, in accordance with the drive modes and parameters from parts when the vehicle is in different driving conditions, which will be schematically illustrated below with reference to FIG. 4a -FIG. 4h.

1) Pre-starting condition. After the ignition switch 18 is turned on, firstly the entire vehicle controller 21 checks the status of the various systems of the vehicle, and the vehicle will be in the normal starting condition.

2) Starting condition. After the transmission switch 18 is set in driving mode and the accelerator pedal 23 is depressed, the entire vehicle controller 21 receives a starting signal and sends instructions to start the main motor 5 to work via the main motor controller 30. Electric power from the power battery 8 is transmitted to the main motor via the distribution box 27 and the main motor controller 30, and the main motor starts to work, then the motor power transmitted to the driving wheel 7 via the output shaft of the transmission 4, the final drive and the drive shaft 16/33, and the vehicle is started to run.

3) Low-speed running condition. After being started, the vehicle is driven mainly by the main motor 5. This is the pure electric motor driving mode, as shown in FIG. 4b. When the quantity of electric charge of the power battery 8 is less than a certain value, the entire vehicle controller 21 sends instructions to start the internal combustion engine via the internal combustion engine control unit 14 and the auxiliary motor controller 32. After the internal combustion engine is started, the auxiliary motor controller 32 quickly starts the auxiliary motor system in generating power mode. The generated power is transmitted to the driving wheel 7 to drive the vehicle via the auxiliary motor 2, the auxiliary motor controller 32, the distribution box 27, the main motor controller 30, the main motor 5, the output shaft of the transmission 4, and the final drive and the drive shaft 16/33. This is the series driving mode, as shown in FIG. 4c.

4) Normal driving condition. The internal combustion engine works in the region with high efficiency. The vehicle is driven only by parts of the output power from the engine, and the rest parts of the output power is for driving the generator so as to recharge the power battery 8. This is the internal combustion engine independent driving mode, as shown in FIGS. 4*f*, 4*g*.

5) Full-accelerating condition. When the accelerator pedal 23 is stepped down completely to accelerate the vehicle, if the quantity of electric charge of the power battery 8 is more than the lowest limit of a preset SOC value, the output power from the internal combustion engine 1 and that from the main motor 5 will both be at the max value, which will be combined together at the output shaft of transmission 4 to drive the vehicle. This is the parallel driving mode, as shown in FIG. 4*d*.

6) Braking and decelerating condition. When the brake pedal 22 is stepped down to decelerate the vehicle, the brake signal is transmitted to the entire vehicle controller 21 by the brake pedal position sensor. The entire vehicle controller 21 calculates the brake torque of the motor in accordance with status of the hybrid power system, and sends instructions to the main motor controller 30, which controls the main motor 5 to brake and generate electric power. The generated electric power is then recharged to the power battery 8. This is the vehicle brake energy recovery mode, as shown in FIG. 4*h*.

7) Idling stop condition. When the vehicle is stopped and the internal combustion engine is in idling status, the entire vehicle controller 21 decides whether the vehicle meets the condition of idling stop in accordance with the status of the hybrid power system. If the condition is met, the entire vehicle controller 21 sends the instructions to the internal combustion engine control unit 14 to stop the engine. This is the idling stop mode of the internal combustion engine, as shown in FIG. 4*a*. Otherwise, the internal combustion engine 1 stays in idling status, until the condition is met or changed to other modes.

8) Auxiliary-driving condition during transmission shifting. In the normal driving condition, when the clutch 3 is released during shifting, the entire vehicle controller 21 give instructions to make the main motor 5 run via the motor controller 30. Accordingly, power will never cease during shifting, making the vehicle more comfortable to ride.

What is claimed is:

1. A power system for a dual-motor hybrid vehicle, comprising: an internal combustion engine, a clutch, a stepped transmission, a drive shaft, a brake system and driving wheels, wherein the power system further comprises:
    a main motor;
    a rotor shaft of the main motor connected with a output shaft of the stepped transmission;
    an auxiliary motor;
    a rotor shaft of the auxiliary motor connected with a crankshaft of the internal combustion engine via a drive mechanism,
    the main motor and the auxiliary motor are electrically connected with a power battery, and
    an entire vehicle controller, which can make the power system work in the following operation modes automatically,
    (a) when the vehicle is in low-speed running operation condition, the system works in a pure electrical driving mode in which the internal combustion engine does not work, and only the main motor drives the drive shaft, or the system works in a series driving mode in which the internal combustion engine only drives the auxiliary motor that generates electric power, and the generated electric power is transmitted to the main motor via the power battery to drive the drive shaft;
    (b) when the vehicle is in full-accelerating operation condition, the system works in a parallel driving mode in which both the internal combustion engine and the main motor drive the vehicle simultaneously;
    (c) when the vehicle is in braking and decelerating operation condition the system works in an energy recovery mode in which the main motor is controlled to brake and generate electric power and the power battery is recharged;
    (d) when the vehicle is during transmission shifting, the system works in auxiliary-driving mode in which the main motor drives the vehicle auxiliary during shifting;
    (e) when the vehicle is in idling stop operation condition, the system works in an idling stop mode in which the internal combustion engine stops working; and
    (f) when the vehicle is in normal driving operation condition, the system works in normal running mode in which the internal combustion engine drives the vehicle independently.

2. The power system of claim 1, wherein the rotor shaft of the main motor is connected with the output shaft of the transmission via a drive mechanism.

3. The power system of claim 2, wherein the drive mechanism is a shaft drive means, a belt drive means, a chain drive means, a gear drive means, a clutch drive means or a combination thereof.

4. The power system of claim 1, wherein the drive mechanism is a shaft drive means, a belt drive means, a chain drive means, a gear drive means, a clutch drive means or a combination thereof.

5. The power system of claim 1, wherein the main motor and the auxiliary motor are connected with the power battery via a controller, a control unit and a loop circuit of a distribution box.

6. The power system of claim 1, wherein the entire vehicle controller can make the power system work in starting mode in which the vehicle is driven automatically by the main motor when the vehicle is being started.

7. The power system of claim 1, wherein the main motor is arranged on a drive shaft.

* * * * *